(12) United States Patent
Frankovich et al.

(10) Patent No.: US 8,379,219 B2
(45) Date of Patent: Feb. 19, 2013

(54) COMPOUND INTERFEROMETER WITH MONOLITHIC MEASUREMENT CAVITY

(75) Inventors: John Weston Frankovich, Fairport, NY (US); Christopher Alan Lee, Pittsford, NY (US); Michael Joseph Litzenberger, Fairport, NY (US)

(73) Assignee: Corning Incorporated, Corning, NY (US)

( * ) Notice: Subject to any disclaimer, the term of this patent is extended or adjusted under 35 U.S.C. 154(b) by 157 days.

(21) Appl. No.: 13/117,291

(22) Filed: May 27, 2011

(65) Prior Publication Data

US 2012/0300213 A1    Nov. 29, 2012

(51) Int. Cl.
*G01B 11/02*    (2006.01)
*G01B 9/02*    (2006.01)

(52) U.S. Cl. ......... 356/496; 356/485; 356/492; 356/450

(58) Field of Classification Search .................. 356/485, 356/489, 495, 511, 503, 450, 504, 512–514
See application file for complete search history.

(56) References Cited

U.S. PATENT DOCUMENTS

| | | | |
|---|---|---|---|
| 5,995,226 A * | 11/1999 | Abe et al. ....................... | 356/511 |
| 6,480,286 B1 | 11/2002 | Kubo et al. | |
| 6,504,615 B1 | 1/2003 | Abe et al. | |
| 6,822,745 B2 | 11/2004 | De Groot et al. | |
| 6,847,458 B2 | 1/2005 | Freischlad et al. | |
| 6,977,730 B2 | 12/2005 | Evans | |
| 7,268,887 B2 | 9/2007 | Kulawiec et al. | |
| 7,342,666 B2 | 3/2008 | Ueki et al. | |
| 7,417,743 B2 | 8/2008 | De Groot | |
| 2001/0028462 A1 * | 10/2001 | Ichihara et al. ................ | 356/512 |
| 2003/0227632 A1 * | 12/2003 | Marcus et al. ................. | 356/497 |
| 2004/0184038 A1 * | 9/2004 | Freischlad et al. ............ | 356/512 |
| 2006/0139656 A1 * | 6/2006 | Kulawiec et al. .............. | 356/512 |
| 2007/0070360 A1 * | 3/2007 | Cheng et al. ................... | 356/630 |
| 2007/0229842 A1 * | 10/2007 | Jansen ............................ | 356/492 |
| 2010/0208272 A1 * | 8/2010 | Tang et al. ..................... | 356/503 |
| 2011/0279822 A1 * | 11/2011 | Kannaka et al. ............... | 356/503 |

FOREIGN PATENT DOCUMENTS

| | | |
|---|---|---|
| CN | 1281974 A | 1/2001 |
| CN | 1126945 C | 11/2003 |
| EP | 1460374 | 9/2004 |
| EP | 1840502 | 10/2007 |
| WO | 2006071569 A2 | 7/2006 |
| WO | 2010150003 A1 | 12/2010 |

OTHER PUBLICATIONS

English translation of CN1281974A.
de Groot et al "Optical Interferometry for Measurement of the Geometric Dimensions of Industrial Parts"; Applied Optics, vol. 41 No. 19 (2002) pp. 3853-3860.

\* cited by examiner

*Primary Examiner* — Gregory J Toatley
*Assistant Examiner* — Dominic J Bologna
(74) *Attorney, Agent, or Firm* — Timothy M. Schaeberle (57) ABSTRACT

A compound common-path interferometer including first and second measurement arms for measuring a test object is arranged so that a reference optic of the first measurement arm is disconnected from a remainder of the first measurement arm and a coupling between the reference optics of the first and second measurement arms forms a monolithic measurement cavity for maintaining reference surfaces of the reference optics at a fixed spacing and orientation. Separate supports are provided for the monolithic measurement cavity and the remainder of the first measurement arm.

21 Claims, 6 Drawing Sheets

COMPOUND INTERFEROMETER WITH MONOLITHIC MEASUREMENT CAVITY

TECHNICAL FIELD

The invention relates to compound common-path interferometers having interrelated measurement arms, particularly Fizeau interferometers in which at least one of two measurement arms has access to the Fizeau reference optics of both measurement arms.

BACKGROUND OF THE INVENTION

Two-sided measurement of opaque parts, including part assemblies, by interferometers involves separately measuring the two sides and relating the separate measurements to each other for making comparisons between the two sides. Part parameter comparisons include three-dimensional form, profile, flatness, parallelism, and thickness.

The measurement of opposite side surfaces of opaque parts is difficult to accomplish using conventional interferometry, particularly for purposes of both measuring the two sides individually, such as for determining flatness of each, and measuring the two sides relative to each other, such as for determining parallelism and thickness. For example, separate interferometers can be used to measure the two sides individually for determining flatness, but each produces a relative measure unrelated to the other.

To overcome such difficulties, two common-path interferometers have been arranged end to end so that their respective reference surfaces form a measuring cavity straddling the opaque test parts. One interferometer measures distances between corresponding points on a first side of the opaque test parts and its reference surface. The other interferometer measures distances between corresponding points on a second side of opaque test parts and its reference surface. At least one of the two overlapping interferometers also measures distances between corresponding points on the two reference surfaces. Distances between points on opposite sides of the opaque test parts can be calculated from the relative measures of their two sides and the two reference surfaces. Each side of the opaque test parts can be individually defined and spatially related to their other side for constructing a three-dimensional representation of the opaque test parts.

Generally, the two measurement arms are bolted together to maintain the two measurement arms in a common orientation within which the opposite side measurements are made. Through such connections, mechanical and thermal instabilities within either of the measurement arms can be transferred to the other. For example, mechanical displacements, including vibrations, as well as changes in temperature or pressure, can affect the relative orientation of the two reference surfaces, which complicates comparisons between the measurements taken by the two measurement arms.

SUMMARY OF THE INVENTION

The invention, among its preferred embodiments, features a compound common-path interferometer having two measurement arms (i.e., one for each of two common-path interferometers) that are in one sense interconnected end to end for purposes of taking related measurements but are in another sense unconnected for reducing undesirable cross influences. For example, a thermally stable coupling interconnects the reference optics of the two measurement arms to provide a monolithic measurement cavity for both measurement arms. However, the remainder of at least one of the measurement arms is disconnected from and supported independently of its reference optic so that the two reference optics are not subject to different dynamic influences (i.e., disturbances). The primary benefits of interconnecting the two measurement arms are realized by the monolithic measurement cavity, while the primary disadvantages of interconnecting the two measurement arms are avoided by disconnecting a remainder of at least one of the arms.

The two coupled reference optics form a common optical reference cavity within which a test object can be measured in relation to both reference optics. Any optical path differences between object and reference beams of each measurement arm occur within the common optical reference cavity. The object and reference beams propagate along common optical paths within the remainder of each of the two measurement arms. While propagating along the common paths, influences such as thermal or mechanical instabilities affecting the object beams have similar effects on the commonly propagating reference beams.

Interference patterns formed by overlapping reflections from object and reference surfaces within the common optical reference cavity remain stable despite thermal and mechanical influences affecting the two measurement arms for three main reasons. First, the common optical reference cavity is formed as a monolithic measurement cavity so that any such dynamic influences affecting one of the reference surfaces similarly affects the other reference surface. Second, the object and reference beams within the remainder of each of the two measurement arms propagate along common pathways so that any such dynamic influences affecting one of the object or reference beams similarly affects the other of the object or reference beams. Third, the monolithic measurement cavity is isolated from the remainder of at least one of the measurement arms for preventing dissimilar or out-of-phase disturbances between the two measurement arms from stressing the monolithic measurement cavity.

The test object is preferably supported within the monolithic measurement cavity so that the test object is subject to the same dynamic influences as the monolithic measurement cavity. Preferably, the reference optics of the two measurement arms are disconnected from the remainders of their two measurement arms so that the common optical reference cavity is isolated from the remainders of both measurement arms for further limiting dynamic influences on the monolithic measurement cavity.

At least two substantially independent support systems are preferably used. For example, one support system can be used to support one of the measurement arms together with the monolithic measurement cavity, and another support system can be used to support the remainder of the other measurement arm. Alternatively, the monolithic measurement cavity can be disconnected from the remainders of both measurement arms and the remainders of the two measurement arms can be interconnected independently of the monolithic measurement cavity. One support system can be used to support the monolithic measurement cavity and another support system can be used to support the interconnected remainders of both measurement arms. If the remainders of the two measurement arms are not interconnected, three substantially independent support systems can be used to separately support the monolithic measurement cavity and each of the remaining portions of the measurement arms.

DETAILED DESCRIPTION OF THE INVENTION

Figure 1:
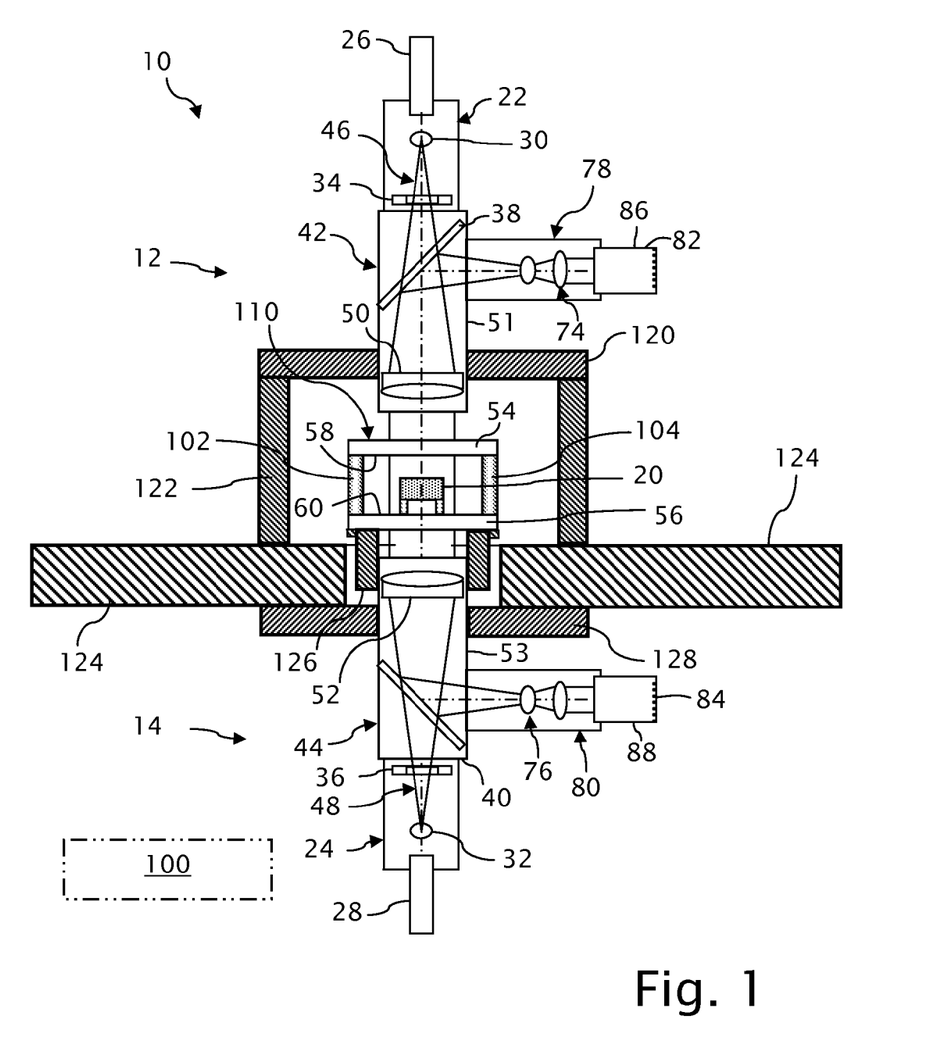
FIG. 1 is a diagram of a compound common-path interferometer including two measuring arms sharing a monolithic measurement cavity with a remainder of one of the measuring arms connected to the monolithic reference structure and two separate supports for the remainders of the two measuring arms.
Figure 2:
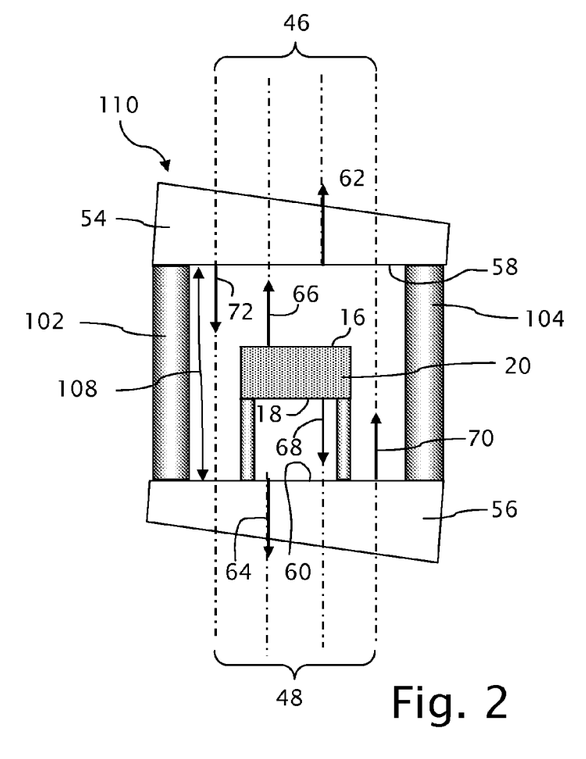
FIG. 2 is a diagram of the monolithic measurement cavity depicting multiple reflections for producing interference patterns between each opposite side surface of a test object and adjacent reference surfaces of the monolithic measurement cavity and between the reference surfaces of the monolithic measurement cavity.

A compound common-path interferometer 10 as depicted in FIG. 1 includes an upper common-path interferometer 12 and a bottom common-path interferometer 14 for measuring opposite first and second sides 16 and 18 of an opaque test part 20 (see also FIG. 2). The opaque test part 20 can be a part that is made of materials that are not transmissive within the range of frequencies propagated by the common-path interferometers 12 and 14 or that is sufficiently diffuse to preclude the ordered transmission of such frequencies.

The upper and lower interferometers 12 and 14 include respective first and second illuminators 22 and 24, which can include customary light sources 26 and 28 and beam shapers 30 and 32 for outputting coherent first and second measuring beams 46 and 48. For example, the light sources 26 and 28 can be semiconductor diode lasers, and the beam shaping optics 30 and 32 can include beam expanders and conditioners for affecting distributions of light within the measuring beams 46 and 48.

Within their respective upper and lower interferometers 12 and 14, the first and second measuring beams 46 and 88 propagate through first and second shutters 34 and 36 to first and second beamsplitters 38 and 40, where the first and second measuring beams 46 and 48 are directed (e.g., reflected) into first and second measuring arms 42 and 44. Opening and closing of the first and second shutters 34 and 36 are preferably coordinated by a common processor/controller 100 for alternately blocking the propagation of one or the other of the first and measuring beams 46 and 48 to prevent light from one interferometer 12 or 14 from mixing with the light from the other interferometer 14 or 12. The first and second beamsplitters 38 and 40 can take the form of pellicle beamsplitters, beamsplitter cubes, or beamsplitter plates based on splitting amplitude or polarization.

The measurement arms 42 and 44 include dual functioning optics 50 and 52 within housings 51 and 53, which when necessary contribute to both illuminating and imaging the test part 20. The illuminating function of the dual optics 50 and 52 generally provides for sizing and shaping respective wavefronts of the measuring beams 46 and 48 to nominally match the shapes of the opposite side surfaces 16 and 18 of the test part 20.

With reference to the enlarged view of FIG. 2, the first and second measurement arms 42 and 44 also include first and second reference optics 54 and 56 (e.g., Fizeau wedges) having first and second reference surface 58 and 60 for reflecting portions of the first and second measuring beams 46 and 48 as reference beams 62 and 64. Remaining portions of the measuring beams 46 and 48 propagate through the first and second reference optics 54 and 56, and certain transverse sections of the remaining portions of the measuring beams 46 and 48 reflect from the opposite sides 16 and 18 of the test object 20 as test object beams 66 and 68, and other transverse sections of the remaining portions of the measuring beams 46 and 48 propagate past the test object 20 and reflect from the reference surfaces 60 and 58 as test reference beams 70 and 72.

Figure 3A:
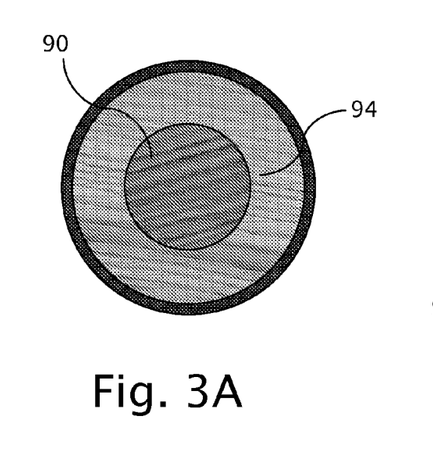
FIGS. 3A and 3B depict the various interference patterns formed among the opposite side surfaces of the test optic and the reference surfaces of the monolithic measurement cavity.
Figure 3B:
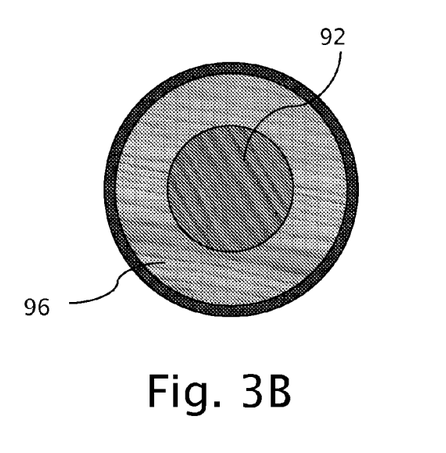

As shown in FIG. 3A, the test object beam 66 combines with the reference beam 62 at the reference surface 58 to form an interference pattern 90 registering differences between the test object surface 16 and the reference surface 58. The test reference beam 70 combines with the reference beam 62 at the reference surface 58 to form an interference pattern 94 registering differences between the reference surface 60 and the reference surface 58. As shown in FIG. 3B, the test object beam 68 combines with the reference beam 64 at the reference surface 60 to form an interference pattern 92 registering differences between the test object surface 18 and the reference surface 60. The test reference beam 72 combines with the reference beam 64 at the reference surface 60 to form an interference pattern 96 registering differences between the reference surface 58 and the reference surface 60.

The reflected test object beam 66, test reference beam 70, and the reference beam 62 all propagate along a common optical pathway through the measurement arm 42 to the beamsplitter 38, where at least portions of the beams 66, 70, and 62 are directed (e.g., transmitted) into a recording arm 78 of the upper interferometer 12. Similarly, the reflected test object beam 68, test reference beam 72, and the reference beam 64 all propagate along a common optical pathway through the measurement arm 44 to the beamsplitter 40, where at least portions of the beams 68, 72, and 64 are directed (e.g., transmitted) into a recording arm 80 of the lower interferometer 14.

Within the recording arm 78, the interference patterns 90 and 94 formed at the first reference surface 58 are imaged onto detector surface 82 of camera 86. Within the recording arm 80, the interference patterns 92 and 96 formed at the second reference surface 60 are imaged onto detector surface 84 of camera 88. The detector surfaces 82 and 84 preferably include detector arrays for measuring beam intensity throughout a field of view encompassing the opposite sides 16 and 18 of the test part 20 as well as remaining areas exposed between the reference surfaces 58 and 60. The dual optics 50 and 52 preferably contribute to the formation of the referenced images onto the detector surfaces 82 and 84. However, the cameras 86 and 88 can include or be associated with imaging optics 74 and 76 for resizing or otherwise completing the imaging of the referenced images onto the detector surfaces 82 and 84.

Of particular note in FIGS. 1 and 2, the first and second reference optics 54 and 56 within the first and second measurement arms 42 and 44 are physically interconnected by pillars 102 and 104. Although only the two pillars 102 and 104 are shown in the referenced figures for purposes of simplifying the illustrations, three or more circumferentially separated pillars are preferably used to provide at least three points of contact between each of the first and second reference optics 54 and 56. Clearance is provided between at least two of the pillars, e.g., 102 and 104, to permit access for inserting and removing test objects such as the test object 20 into a measurement space between the reference optics 54 and 56. Other types of connections between the two reference optics 54 and 56 can be provided, such as a C-shaped solid, partially cylindrical connection, where access is preserved through an opening in the partially cylindrical connection.

The depicted pillars 102 and 104, as well as alternative connectors between the reference optics 54 and 56, can be made from a variety of materials. However, the pillars 102 and 104 or the alternative connectors are preferably made of a material that is relatively insensitive to thermal influences. Materials such as Invar, a nickel steel alloy, having a low coefficient of thermal expansion are preferred.

The two reference surfaces 58 and 60 form an optical reference cavity 108, and the two reference optics 54 and 56 together with the pillars 102 and 104 or the alternative connectors form a monolithic measurement cavity 110, which protects and preserves the overall integrity of the optical reference cavity 108. The pillars 102 and 104 or the alternative connectors maintain a constant spacing and relative orientation between the two reference surfaces 58 and 60. Kinematically, the monolithic measurement cavity 110 assures that the two reference surfaces 58 and 60 are subject to the same motion, as if parts of a single body. Thus, any motion affecting one of the two reference surfaces 58 or 60 similarly affects the other of the two reference surfaces 60 or 58. However, the low coefficient of thermal expansion of the pillars 102 and 104 or the alternative connectors resists changes in the height of the pillars 102 and 104 or the alternative connectors accompanying changes in the temperature of either or both of the reference optics 54 and 56.

The test part 20 is mounted within the optical reference cavity 108, preferably from spacer supports, such as the posts 112 and 114, which tie the test part 20 to the monolithic measurement cavity 110. The posts 112 and 114 (which as opposed to the illustration preferably number at least three) are shown resting on the reference surface 60 of the reference optic 56, but alternative connections can be made to either reference optic 54 or 56 or the pillars 102 and 104 or other connectors between the reference optics 54 and 56. For example, the test part 20 could be alternatively supported on wires extending from the pillars 102 and 104 or from an intermediate structure that is itself connected to the monolithic measurement cavity 110. The wires or other fine structures provide for obscuring as little of the test part 20 as possible and can be overlaid directly on the reference surface 60.

During measurements in which the test part 20 is illuminated by portions of the measurement beams 46 and 48, the test part 20 is preferably mounted as if a part of the monolithic measurement cavity 110 for maintaining a constant spacing and orientation between the opposite side surfaces 16 and 18 of the test part 20 and the reference surfaces 58 and 60 of the reference optics 54 and 56. Thus, the interference patterns 90 and 94 formed within the upper interferometer 12 and the interference patterns 92 and 96 formed within the lower interferometer 14 are minimally affected by disturbances that affect the monolithic measurement cavity 110 as a whole. Individual interferometric measurements from the interference images 90, 92, 94, and 96 captured on the detector surfaces 82 and 84 are taken in the direction of wavefront propagation as measures of optical path length differences between the interfering beams (e.g., 66 and 62, 68 and 64, 70 and 62, and 72 and 64) to accuracies that can finely divide the wavelength of the measuring beams 26 and 28. Since the interfering beams (e.g., 66 and 62, 68 and 64, 70 and 62, and 72 and 64) travel common optical path lengths within the remainders of the measuring arms 42 and 44 outside the monolithic measurement cavity 110, disturbances outside the monolithic measurement cavity 110 or disturbances between the monolithic measurement cavity 110 and the remainders of the measuring arms 42 and 44 have little effect on the measurement accuracies. The number of measurements taken within the field illuminated on the detector surfaces 82 and 84 is generally limited, based for example on the number of detectors within the detector arrays. The spacing between such measurements (e.g., the spacing between the detectors) is preferably set in relation to the expected point spread function of the imaged points and is generally many magnitudes larger than the accuracies achieved by the measurements themselves. Because of the normal precautions taken in the designs of interferometers, most disturbances affecting interferometers, including changes in temperature, pressure, movements of air, and mechanical vibrations, are not of a magnitude capable of displacing the overall interference images 90, 92, 96, and 96 by amounts that vitiate the interferometric measurements. That is, the propagation of the interference images 90, 92, 96, and 96 through the remainder of the measuring arms 42 and 44 and recording arms 78 and 80 is significantly less sensitive to such disturbances. The monolithic measurement cavity 110 having protected the formation of the interference images 90, 92, 96, and 96 against such disturbances in a first instance, the monolithic measurement cavity 110 between the measurement arms 42 and 44 makes the interferometers 12 and 14 more robust and less sensitive to disturbances that otherwise might affect the interferometric measurements.

The monolithic measurement cavity 110 is formed not only as an effectively integral structure as already described, but at least one of the reference optics, e.g., the reference optic 54 of FIG. 1, is disconnected from the remainder of its measurement arm, e.g., 42. For example, the housing 51 of the measurement arm 42 has no direct physical connection to the reference optic 54 independently of the reference optic's mounting as a part of the monolithic measurement cavity 110. Instead, the housing 51 of the measurement arm 42 is mounted via a flange 120 and collar 122 to a base 124, which preferably has substantial mass (e.g., as a granite slab or steel plate) to isolate the interferometer 12 from environmental disturbances. The monolithic measurement cavity 110, however, is connected through a collar 126 to the housing 53 of the measurement arm 44, and the housing 53 of the measurement arm 44 is connected through a flange 128 to the base 124. By separating one of the reference optics 54 from the remainder of its measurement arm 42, the two reference optics 54 and 56 are not subject to different movements, transfers, or other disturbances otherwise associated with their different measurement arms 42 and 44. The isolation of the monolithic measurement cavity 110 from one of the measurement arms 42 reduces structural demands on the monolithic measurement cavity 110 for maintaining the two reference surfaces 58 and 60 at a constant spacing and relative orientation.

The disconnection of the reference optic 54 from the remainder of its measurement arm 42 can be accomplished by either removing some prior connection or by avoiding making such a connection in the first instance. The concept of disconnecting the reference optic 54 from the remainder of its measurement arm 42 is particularly useful for highlighting a modification with respect to conventional common-path interferometers in which the reference optics are physically coupled to the remainders of their measurement arms.

Figure 4:
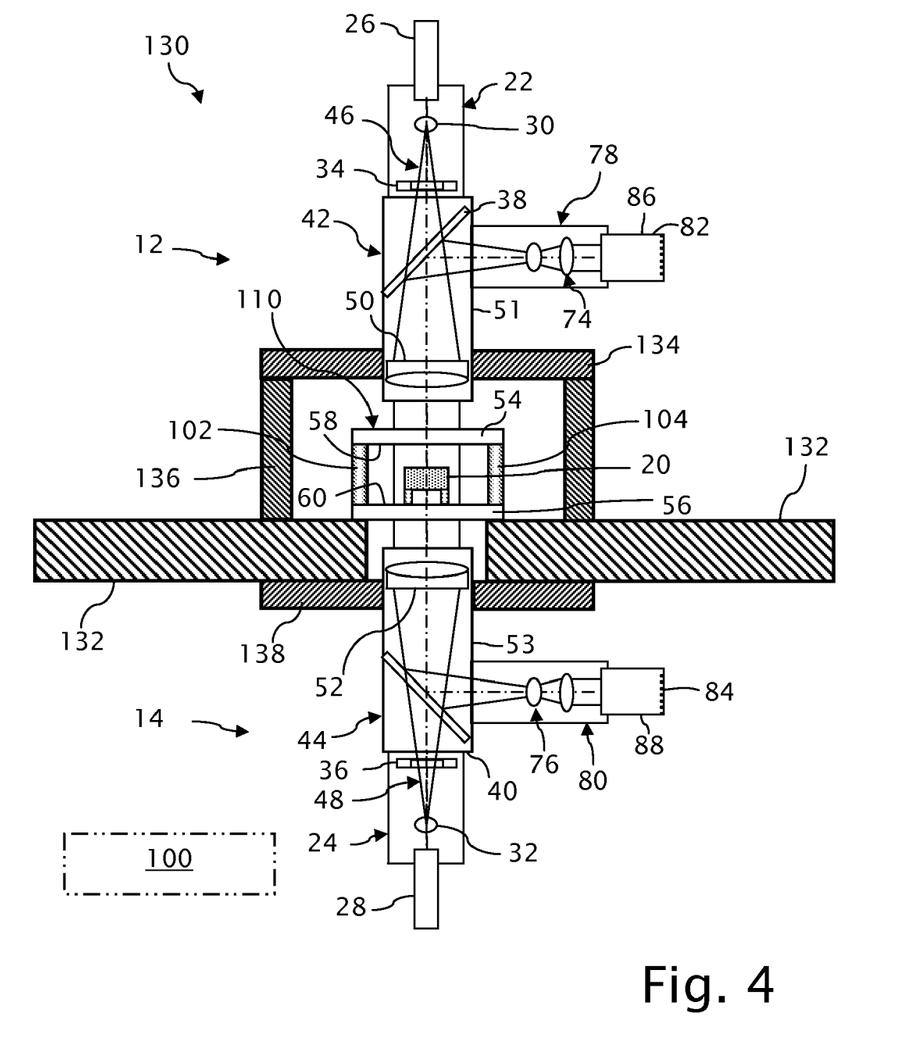
FIG. 4 is a diagram of a similar compound common-path interferometer in which the monolithic measurement cavity is isolated from the remainders of the two measuring arms and three separate supports are provided for the monolithic measurement cavity and the remainders of the two measuring arms.

A compound common-path interferometer 130 depicted in FIG. 4 is intended to be optically identical to the compound common-path interferometer 10 of FIG. 1 to emphasize differences in the way in which the compound common-path interferometer 130 is mechanically supported. As such, the same reference numerals applied to the optical components of the compound common-path interferometer 10 are applied to the optical components of the compound common-path interferometer 130. In addition, the compound common-path interferometer 130 incorporates the monolithic measurement cavity 110 of the compound common-path interferometer 10. Differences exist in the way in which the monolithic measurement cavity 110 and the remainders of the two measurement arms 42 and 44 are mounted to a common base 132.

The monolithic measurement cavity 110 is mounted directly on the common base 132, which like the base 124 preferably has a substantial mass to isolate the compound common-path interferometer 130 from vibrations and other disturbances within its ambient environment. A flange 134, which projects from the housing 51 of the measurement arm 42, and a collar 136, which connects the flange 134 to the common base 132, collectively connect the remainder of the measurement arm 42 to the common base 132 independently of the monolithic measurement cavity 110. A flange 138, which projects from the housing 53 of the measurement arm 44, connects the remainder of the measurement arm 44 to the common base 132 independently of the monolithic measurement cavity 110. Thus, the reference optics 54 and 56 of the monolithic measurement cavity 110 are mechanically disconnected from the remainders of their two measurement arms 42 and 44, and each of the monolithic measurement cavity 110 and the remainders of the two measurement arms 42 and 44 are separately supported by the common base 132.

Figure 5:
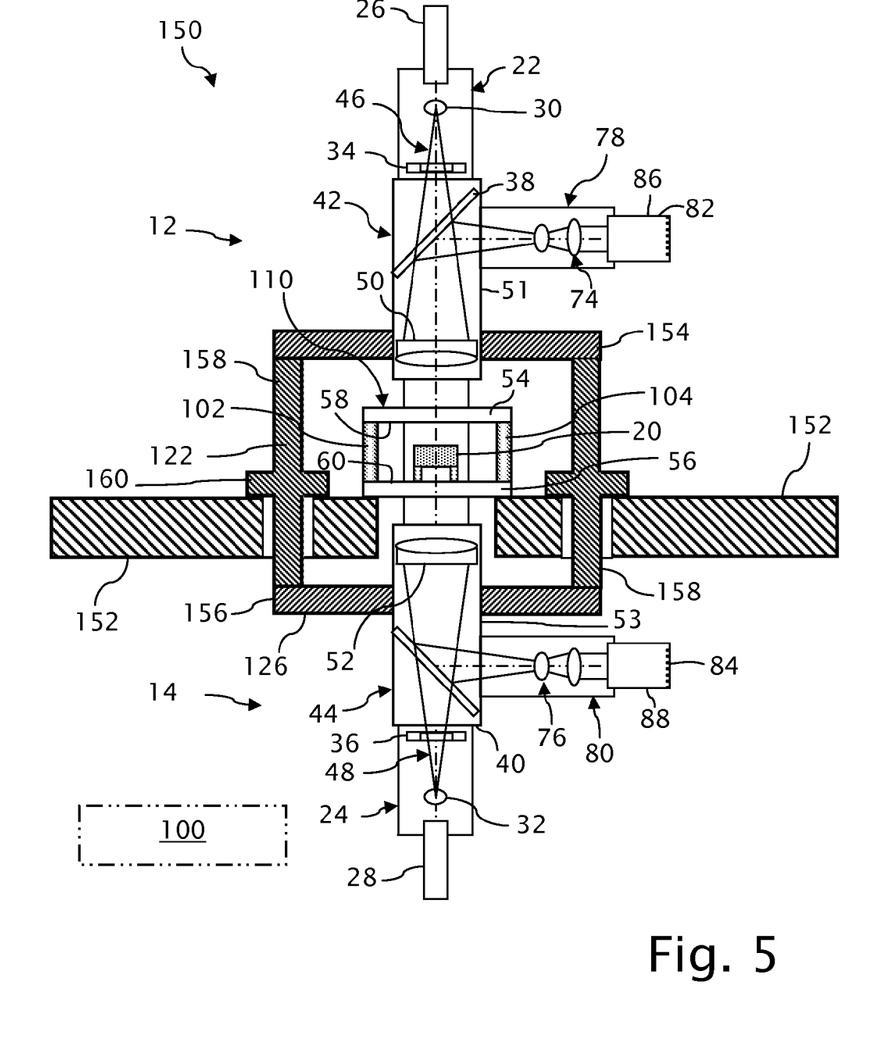
FIG. 5 is a diagram of a similar compound common-path interferometer in which the monolithic measurement cavity is isolated from the remainders of the two measuring arms, the remainders of the two reference arms are interconnected, and two separate supports are provided for the monolithic measurement cavity and the interconnected remainders of the two measuring arms.

Another compound common-path interferometer 150, which is optically identical to the compound common-path interferometers 10 and 130 of FIGS. 1 and 4, is depicted in FIG. 5. Again, the common optical components share the same reference numerals as the optical components of the compound common-path interferometers 10 and 130. The compound common-path interferometer 150 also incorporates the monolithic measurement cavity 110 of the compound common-path interferometers 10 and 130.

Similar to the compound common-path interferometer 130, the monolithic measurement cavity 110 is mounted directly on a common base 152, which is itself similar to the bases 124 and 132 of the preceding embodiments. A flange 154 projects from the housing 51 of the measurement arm 42, and a flange 156 projects from the housing 53 of the measurement arm 44. A common collar 158 extends between the two flanges 154 and 156 to interconnect the housings 51 and 53 of the measurement arms 42 and 44. A shoulder 160 formed along the length of the common collar 158 connects the two housings 51 and 53 to the common base 152. Independently of their reference optics 54 and 56, the remainders of the measurement arms 42 and 44 are mechanically interconnected to each other and jointly connected to the common base 152. Although the remainders of the two measurement arms 42 and 44 are connected to each other, the reference optics 54 and 56 of the monolithic measurement cavity 110 remain mechanically disconnected from the remainders of both of the measurement arms 42 and 44. This arrangement isolates the monolithic measurement cavity 110 from disturbances affecting either of the measurement arms 42 or 44, even though some such disturbances are transferable between the measurement arms 42 and 44. The direct connection between the remainders of the measurement arms 42 and 44, particularly between the housings 51 and 53, aids in the alignment of the illumination and imaging optics, particularly the dual optics 50 and 52, between the two interferometers 12 and 14.

Figure 6:
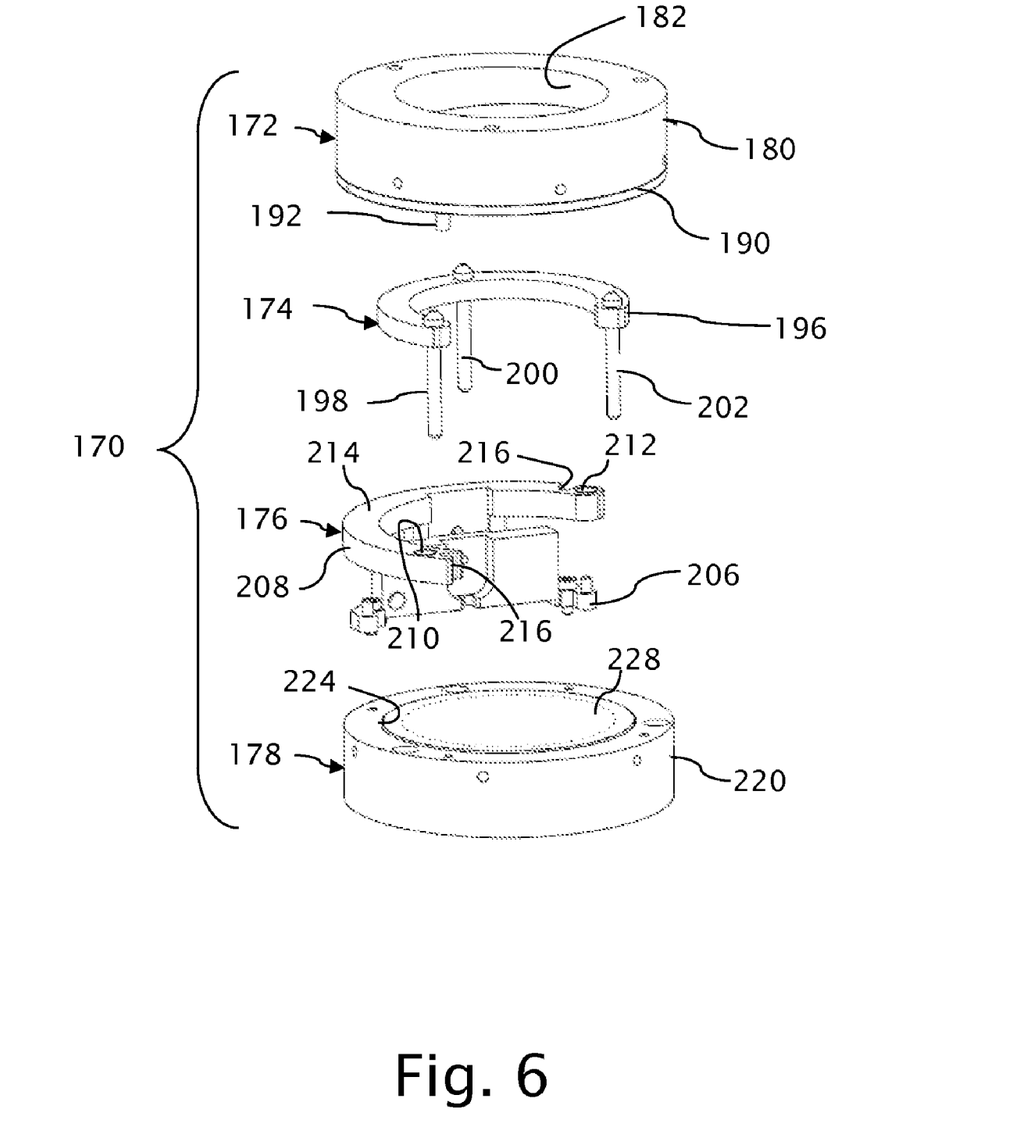
FIG. 6 is an exploded view of a monolithic measurement cavity.
Figure 7:
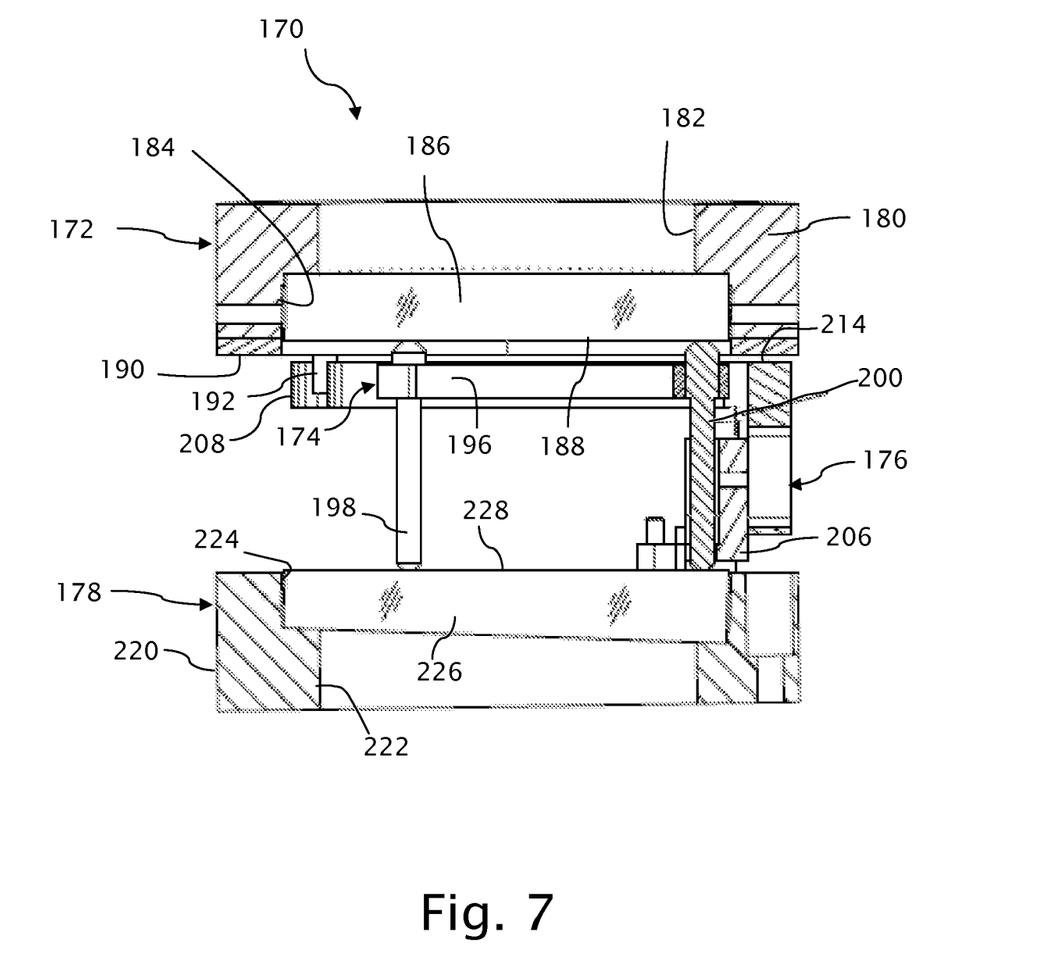
FIG. 7 is a cross-sectional view of the monolithic measurement cavity of FIG. 6 in an assembled condition.

FIGS. 6 and 7 depict a more detailed example of a monolithic measurement cavity 170, which can be substituted for the monolithic measurement cavity 110 of the preceding examples. Major components of the monolithic measurement cavity 170 are separately shown in the exploded view of FIG. 6. The major components include an upper Fizeau assembly 172, a Fizeau spacing apparatus 174, a preloading and locating apparatus 176, and a lower Fizeau assembly 178.

The upper Fizeau assembly 172 comprises an annular housing 180, preferably made of aluminum, having an aperture 182 for transmitting light and a recess 184 for receiving a Fizeau wedge 186, which functions as a reference optic, having a reference surface 188. A magnetically permeable ring 190, which is preferably made of steel or another ferromagnetic material, is attached to the bottom of the annular housing 180 surrounding the Fizeau wedge 186. A pair of locating pins 192 project from a bottom surface of the assembly 172.

The Fizeau spacing apparatus 174 comprises a C-shaped collar 196 and three spacing pins 198, 200, and 202. The three spacing pins 198, 200, and 202 are preferably made of a thermally stable material such as Invar. In addition, each of the three spacing pins 198, 200, and 202 has rounded ends, which can be formed as end caps or other appendages, including steel balls, to provide point contact with abutting structures (e.g., the reference surface 188 of the Fizeau wedge 186).

The preloading and locating apparatus 176 includes a fixture base 206 and an adjustable C-shaped collar 208. The fixture base 206 is arranged to be bolted or otherwise fastened to the lower Fizeau assembly 178. The adjustable C-shaped collar 208 can be adjusted to various heights above the fixture base 206 and supports a pair of magnets 210 and 212, which are exposed through an upper surface 214 of the adjustable C-shaped collar 208. Clearance is provided to allow the three spacing pins 198, 200, and 202 to extend through the preloading and locating apparatus 176. Recesses 216 are provided to receive the locating pins 192 that project from a bottom surface of the assembly 172 for approximately locating the upper Fizeau assembly with respect to the lower Fizeau assembly 178.

The lower Fizeau assembly 178 comprises an annular housing 220, preferably made of aluminum, having an aperture 222 for transmitting light and a recess 224 for receiving a Fizeau wedge 226, which functions as a reference optic, having a reference surface 228.

With particular reference to FIG. 7, the monolithic measurement cavity 170 is assembled by (a) bolting the fixture base 206 of the preloading and locating apparatus 176 to the annular housing 220 of the lower Fizeau assembly 178, (b) mounting one end of the spacing pins 198, 200, and 202 of the spacing apparatus 174 directly on the reference surface 228 of the Fizeau wedge 226, and (c) mounting the reference surface 188 of the Fizeau wedge 186 within the upper Fizeau assembly 172 directly on the other end of the spacing pins 198, 200, and 202. The locating pins 192 projecting from a bottom surface of the upper Fizeau assembly 172 guide the assembly.

The adjustable C-shaped collar 208 is adjustable vertically to position the magnets 210 and 212 proximate to the magnetically permeable ring 190 of the upper Fizeau assembly 172 to provide a preload force to hold the assembly together with the two reference surfaces 188 and 228 engaged with the opposite ends of the three spacing pins 198, 200, and 202 and held in place through coulomb friction. Once so assembled, the monolithic measurement cavity 170 functions as a single body for maintaining a desired spacing and orientation between the reference surfaces 188 and 228. The C-shaped collar 196 of the Fizeau spacing apparatus 174 fits within the adjustable C-shaped collar 208 of the preloading and locating apparatus 176 in a common orientation to provide a clearance space through which test parts, such as the test part 20, can be mounted within the monolithic measurement cavity 170.

Although shown with magnets 210 and 212 providing the desired preload, the preload could also be provided by other means including springs or the force of gravity. A more permanent spacing and orientation can be provided between the reference surfaces 188 and 228 by forming a solid connection between the Fizeau wedges 186 and 226 or between the upper and lower Fizeau assemblies 172 and 178.

For purposes of more clearly distinguishing between different ways of mounting the upper and lower common-path interferometers 12 and 14, the above embodiments of FIGS. 1, 4, and 5 are depicted with identical optics. However, the upper and lower common-path interferometers 12 and 14 can take a variety of forms provided that the test and reference beams produced within the monolithic measurement cavity travel along a common pathway to the detector. In fact, the illuminating and imaging pathways to the monolithic measurement cavity can be separated provided that the test and reference beams take the same imaging pathway to the detector. The orientation of the combined interferometers can also be varied. For example, the measurement arms of the two interferometers can be oriented in a common horizontal direction. U.S. Pat. No. 7,268,887 of Kulawiec et al, which is hereby incorporated by reference, discloses examples of compound common-path interferometers that can be arranged in accordance with the invention.

The invention claimed is:

1. A compound common-path interferometer comprising:
   a first interferometer having a first measurement arm,
   a second interferometer having a second measurement arm,
   a base for supporting the first and second measurement arms,
   each of the first and second measurement arms including a reference optic and a common optical pathway for a test beam from a test object and a reference beam from the reference optic,
   the reference optic of the first measurement arm being unconnected to a remainder of the first measurement arm for limiting transmission of disturbances between the reference optic of the first measurement arm and the remainder of the first measurement arm,
   a coupling between the reference optics of the first and second measurement arms forming together with the reference optics a monolithic measurement cavity for maintaining reference surfaces of the reference optics at a fixed spacing and orientation, and
   the monolithic measurement cavity being connected to the base independently of the remainder of the first measurement arm.

2. The compound common-path interferometer of claim 1 in which the reference optic of the second measurement arm is connected to a remainder of the second measurement arm, and the monolithic measurement cavity is connected to the base through the remainder of the second measurement arm.

3. The compound common-path interferometer of claim 1 in which the reference optic of the second measurement arm is unconnected to a remainder of the second measurement arm for limiting transmission of disturbances between the reference optic of the second measurement arm and the remainder of the second measurement arm, and the monolithic measurement cavity is connected to the base independently of the remainders of the first and second measurement arms.

4. The compound common-path interferometer of claim 3 in which the remainders of the first and second measurement arms are separately connected to the base.

5. The compound common-path interferometer of claim 3 in which the remainders of the first and second measurement arms are connected to each other.

6. The compound common-path interferometer of claim 1 in which the monolithic measurement cavity includes a support for mounting the test object within the monolithic measurement cavity so that the two reference optics and the test object accommodate disturbances as a single body independently of the remainder of the first measurement arm.

7. The compound common-path interferometer of claim 1 in which the monolithic measurement cavity includes a support for mounting the test object within the monolithic measurement cavity so that the two reference optics and the test object accommodate disturbances as a single body independently of the remainder of the first measurement arm.

8. The compound common-path interferometer of claim 1 in which the coupling between the reference optics of the first and second measurement arms includes a thermally stable spacer between the reference optics of the first and second measurement arms.

9. The compound common-path interferometer of claim 8 in which the coupling between the reference optics of the first and second measurement arms includes a preload mechanism for maintaining the reference optics in engagement with the thermally stable spacer.

10. A method of reducing the effect of environmental disturbances on interferometric measurements made by a compound common-path interferometer comprising the steps of:
    coupling a reference optic within a first measurement arm of a first common-path interferometer to a reference optic within a second measurement arm of a second common path interferometer to form a monolithic measurement cavity for maintaining reference surfaces of the reference optics at a fixed spacing and orientation, and
    supporting the monolithic measurement cavity, which is unconnected to a remainder of the first measurement arm, independently of the remainder of the first measurement arm for limiting transmission of disturbances between the monolithic measurement cavity and the remainder of the first measurement arm.

11. The method of claim 10 in which the step of supporting includes separately connecting the monolithic measurement cavity and the remainder of the first measurement arm to a common base.

12. The method of claim 11 in which the step of supporting includes connecting the monolithic measurement cavity to a remainder of the second measurement arm and connecting the monolithic measurement cavity to the common base through the second measurement arm.

13. The method of claim 11 in which the monolithic measurement cavity is unconnected to a remainder of the second measurement arm for limiting transmission of disturbances between the monolithic measurement cavity and the remainder of the second measurement arm, and the step of supporting includes connecting the monolithic measurement cavity to the common base independently of the remainders of the first and second measurement arms.

14. The method of claim 13 including a step of interconnecting the remainders of the two measurement arms independently of the monolithic measurement cavity.

15. The method of claim 10 including a step of supporting a test object within the monolithic measurement cavity so that the two reference optics and the test object accommodate disturbances as a single body.

16. The method of claim 10 in which the step of coupling includes incorporating a thermally stable spacer between the reference optics of the first and second measurement arms.

17. The method of claim 16 in which the step of coupling includes preloading the reference optics against the thermally stable spacer for maintaining the reference optics in engagement with the thermally stable spacer.

18. A support system for a compound common-path interferometer having first and second measurement arms for measuring a test object comprising:

a coupling between reference optics of the first and second measurement arms forming together with the reference optics a monolithic measurement cavity for maintaining reference surfaces of the reference optics at a fixed spacing and orientation, the reference optic of the first measurement arm being unconnected to a remainder of the first measurement arm for limiting transmission of disturbances between the reference optic of the first measurement arm and the remainder of the first measurement arm, a first support for supporting the monolithic measurement cavity independently of the remainder of the first measurement arm, and a second support for supporting the remainder of the first measurement arm.

19. The support system of claim 18 in which the reference optic of the second measurement arm is connected to a remainder of the second measurement arm, and the first support supports the monolithic measurement cavity through the remainder of the second measurement arm.

20. The support system of claim 18 in which the reference optic of the second measurement arm is unconnected to a remainder of the second measurement arm for limiting transmission of disturbances between the reference optic of the second measurement arm and the remainder of the second measurement arm, and the first support supports the monolithic measurement cavity independently of the remainders of the first and second measurement arms.

21. The support system of claim 20 in which the remainders of the first and second measurement arms are interconnected and the second support supports the remainders of the first and second measurement arms.

* * * * *